United States Patent [19]
Rose et al.

[11] Patent Number: 5,870,740
[45] Date of Patent: Feb. 9, 1999

[54] SYSTEM AND METHOD FOR IMPROVING THE RANKING OF INFORMATION RETRIEVAL RESULTS FOR SHORT QUERIES

[75] Inventors: Daniel E. Rose, Cupertino; Douglass R. Cutting, Oakland, both of Calif.

[73] Assignee: Apple Computer, Inc., Cupertino, Calif.

[21] Appl. No.: 719,816

[22] Filed: Sep. 30, 1996

[51] Int. Cl.$^6$ .................................................. G06F 17/30
[52] U.S. Cl. ..................... 707/5; 707/3; 707/4; 707/7; 707/500
[58] Field of Search .................. 707/3, 4, 5, 7, 707/500

[56] References Cited

U.S. PATENT DOCUMENTS

| | | | |
|---|---|---|---|
| 4,803,614 | 2/1989 | Banba et al. | 364/200 |
| 4,994,967 | 2/1991 | Asakawa | 364/419 |
| 5,263,159 | 11/1993 | Mitsui | 395/600 |
| 5,303,361 | 4/1994 | Colwell et al. | 707/4 |
| 5,321,833 | 6/1994 | Chang et al. | 395/600 |
| 5,404,514 | 4/1995 | Kageneck et al. | 707/5 |
| 5,535,382 | 7/1996 | Ogawa | 707/5 |
| 5,537,586 | 7/1996 | Amram et al. | 707/3 |
| 5,544,049 | 8/1996 | Henderson et al. | 704/7 |
| 5,576,954 | 11/1996 | Driscoll | 707/3 |
| 5,598,557 | 1/1997 | Doner et al. | 707/5 |
| 5,642,502 | 6/1997 | Driscoll | 707/5 |
| 5,659,732 | 8/1997 | Kirsh | 707/5 |
| 5,675,788 | 10/1997 | Husick et al. | 707/104 |
| 5,675,819 | 10/1997 | Schuetze | 704/10 |
| 5,692,176 | 11/1997 | Holt et al. | 1/1 |
| 5,706,497 | 1/1998 | Takahashi et al. | 1/1 |
| 5,737,734 | 4/1998 | Schultz | 707/5 |
| 5,742,816 | 4/1998 | Barr et al. | 707/104 |

OTHER PUBLICATIONS

Hearst, Marti, A., *Improving Full–Text Precision on Short Queries Using Simple Constraints,* In the Proceedings of SDAIR '96, Las Vegas, NV, Apr. 1996, pp.1–16.

Salton, G. and Buckley, C., *Term–Weighting Approaches in Automatic Text Retrieval,* Information Processing & Management, vol. 24 No. 5, 1988, pp. 513–523.

Fox, E. and Koll, M., *Practical Enhanced Boolean Retrieval: Experiences With the Smart and Sire Systems,* Information Processing & Management vol. 24 No. 3, 1988,pp. 257–267.

Salton, G., Fox, E. A., Wu, H., *Extended Boolean Information Retrieval,* Communications of the ACM, vol. 26 No. 12, Dec. 1983, pp. 1022–1036.

*Primary Examiner*—Thomas G. Black
*Assistant Examiner*—Jean R. Homere
*Attorney, Agent, or Firm*—Carr & Ferrell LLP

[57] ABSTRACT

A method and system for retrieving information in response to a query by a user. The method includes the steps of receiving a signal s having a value corresponding to a relevance-ranking algorithm score of a retrieved document, receiving a signal q having a value corresponding to the number of words in the query and a signal v having a value corresponding to the coordination level of the retrieved document and query (i.e., the degree of overlap between the document terms and the query terms), and generating an adjusted score s1 dependent on the signal s, the signal q and the signal v. The adjusted score s1 takes the coordination level into account for small values of q and gradually decreases the importance of the coordination level as q increases. The system of this invention includes a computer-based system for carrying out the method of this invention.

45 Claims, 7 Drawing Sheets

| (I) RANKING | (II) TITLE | (III) WORDS FOUND |
|---|---|---|
| ******** | Ring n' Route - Line Sharing Devices | modem (a) |
| ****** | Apple Directions Express Archive | express (b) |
| ***** | Apple Directions Feb 95 -GeoPort | modem, express (c) |
| **** | Apple Directions Express | express |
| *** | Apple Developer Services FTP Index: Entry E-1 | modem, express |
| ** | Apple Directions Dec 95 - Apple Directions Express | express |
| * | <no title> | modem |
| * | Apple Directions Jan 95 - Macintosh Use Profile S | modem |
| * | About Technical Documentation | modem, express |
| * | Developer University Registration Form | express |

| (I) RANKING | (II) TITLE | (III) WORDS FOUND | |
|---|---|---|---|
| ******* | Apple Directions Feb 95 - Geoport | modem, express | (a) |
| ****** | Apple Developer Services FTP Index; Entry E-1 | modem, express | (b) |
| ***** | About Technical Documentation | modem, express | (c) |
| **** | Apple Directions Jan 95 - Human Interface | modem, express | (d) |
| *** | Apple Directions Mar 95 - Newton Markets | modem, express | (e) |
| *** | GXNEW01- Differences between QuickDraw GX1.11 | modem, express | (f) |
| *** | Apple Directions May 95 - Marketing Multimedia | modem, express | (g) |
| ** | Develop Sept 95 - Music the Easy Way: The Quick Tim | express, modem | (h) |
| * | Ring n' Route - Line Sharing Devices | modem | (i) |
| * | Apple Directions Express Archive | express | (j) |

SYSTEM AND METHOD FOR IMPROVING THE RANKING OF INFORMATION RETRIEVAL RESULTS FOR SHORT QUERIES

BACKGROUND OF THE INVENTION

1. Field of the Invention

The present invention relates generally to an information retrieval system, and more specifically to an information retrieval system adapted to improve ranking of documents retrieved in response to short queries.

2. Description of the Background Art

An information retrieval (IR) system is a computer-based system for locating, from an on-line source database or other collection, documents that are relevant to a user's input query. Until recently, most commercial IR systems, such as DIALOG® or LEXIS®, used Boolean search technology. In a Boolean search system, users must express their queries using the Boolean operators AND, OR, and NOT, and the system retrieves just those documents that exactly match the query criteria. Typically, there is no score or other indication of how well each document satisfies the user's information need.

However, after years of research demonstrating the superiority of relevance-ranking, commercial systems began to offer this capability. Today millions of people use IR systems that employ relevance-ranking, also known as ranked searching, which is based on the "vector space model." In a relevance-ranked search system, users can simply type an unrestricted list of words, even a "natural-language" sentence, as their query. The system then does a partial matching computation and assigns a score to every document indicating how well it matches the user's interest. Documents are then presented to the user in order, from the best matching to the least matching. Relevance-ranking is described in Salton, et al., *Introduction To Modern Information Retrieval*, McGraw-Hill Book Co., New York (1983). Relevance-ranking IR systems are commonly used to access information on the Internet, through systems based on the WAIS (Wide Area Information Servers) protocol or through a variety of commercial World Wide Web indexing service such as Lycos, InfoSeek, Excite, or Alta Vista. Relevance-ranking is also used in commercial information management tools such as AppleSearch, Lotus Notes and XSoft Visual Recall for searching databases or collections from individual or shared personal computers.

Relevance-ranking systems work as follows. In relevance-ranking, each word in every document of a collection is first assigned a weight indicating the importance of the word in distinguishing the document from other documents in the collection. The weight of the word may be a function of several components: (1) a local frequency statistic (e.g., how many times the word occurs in the document); (2) a global frequency statistic (e.g., how many times the word occurs in the entire collection of documents); (3) the DF measure (how many documents in the collection contain the word); and (4) a length normalization statistic (e.g., how many total words are in the document).

The following example demonstrates one possible term-weighting scheme for a relevance-ranking system. First, assume that a collection contains one-hundred (100) documents with one particular document containing only the text "the dog bit the cat." Assume further that the word "the" occurs in all 100 documents while the word "dog" occurs in five (5) documents and the word "cat" occurs in two (2) documents. Here, we use Term Frequency (TF), the number of times the word occurs in a particular document, as our local frequency statistic:

term=dog, TF=1,
term=the, TF=2,
term=cat, TF=1.

Here, we use DF as our global statistic:

term=dog, DF=5/100,
term=the, DF=100/100,
term=cat, DF=2/100, where DF=number of documents containing the term total number of documents.

The inverses of DF (IDF) are calculated as follows:

term=dog, IDF=100/5=20,
term=the, IDF=100/100=1,
term=cat, IDF=100/2=50.

For this example, we will not use a length normalization statistic. Thus the final weights of each term using TF×IDF are as follows:

term=dog, TF×IDF=1×20=20,
term=the, TF×IDF=2×1=2,
term=cat, TF×IDF=1×50=50.

This list of weighted terms serves as the vector that represents the document. Note that terms found in more documents (such as "the") have lower weights than terms found in fewer documents (such as "cat"), even if they occur more frequently within the given document.

Every document in the collection is then assigned a vector of weights, based on various weighting methods such as TF×IDF weighting and weighting that takes TF×IDF and a length normalization statistic into account. After a query is entered, the query is converted into a vector. A similarity function is used to compare how well the query vector matches each document vector. This produces a score for each document indicating how well it satisfies the user's request. One such similarity function is obtained by computing the inner product of the query vector and the document vector. Another similarity function computes the cosine of the angle between the two vectors. Based on relevance-ranking, each document score is calculated and the retrieved documents are then outputted sequentially from the one with the highest score to the one with the lowest score.

A study performed by D. E. Rose and D. R. Cutting on an experimental information retrieval system by Apple Computer, Inc. of Cupertino, Calif. shows that casual users of IR systems prefer to issue short queries. During a four-week period from December 1995 to January 1996, over 50% of the 10,044 queries issued by at least 4,686 users in Apple's system contained only a single word, and no query was longer than 12 words. The mean query length was 1.76 words. A subsequent study performed by Rose and Cutting shows that out of 10,000 queries issued in Apple's system, over 53% were single-word queries and 94% were queries of three words or less. Similar results were obtained for queries placed in systems by Excite and the THOMAS system provided by the federal government. Rose, Daniel E. and Cutting, Douglass R., *Ranking for Usability: Enhanced Retrieval for Short Queries*, (submitted for publication, September 1996). Other studies have confirmed the preference of casual users for issuing short queries. Hearst, Marti A., *Improving Full-Text Precision On Short Queries Using Simple Constraints*, Fifth annual Symposium on Document Analysis and Information Retrieval, pp. 217–225 (1996).

The interfaces of the major Internet search services also encourage queries having few terms. The four well-known World Wide Web searching services (Lycos, InfoSeek, Excite, and AltaVista) present users with an entry field that accepts less than one line of text.

Figure 1:
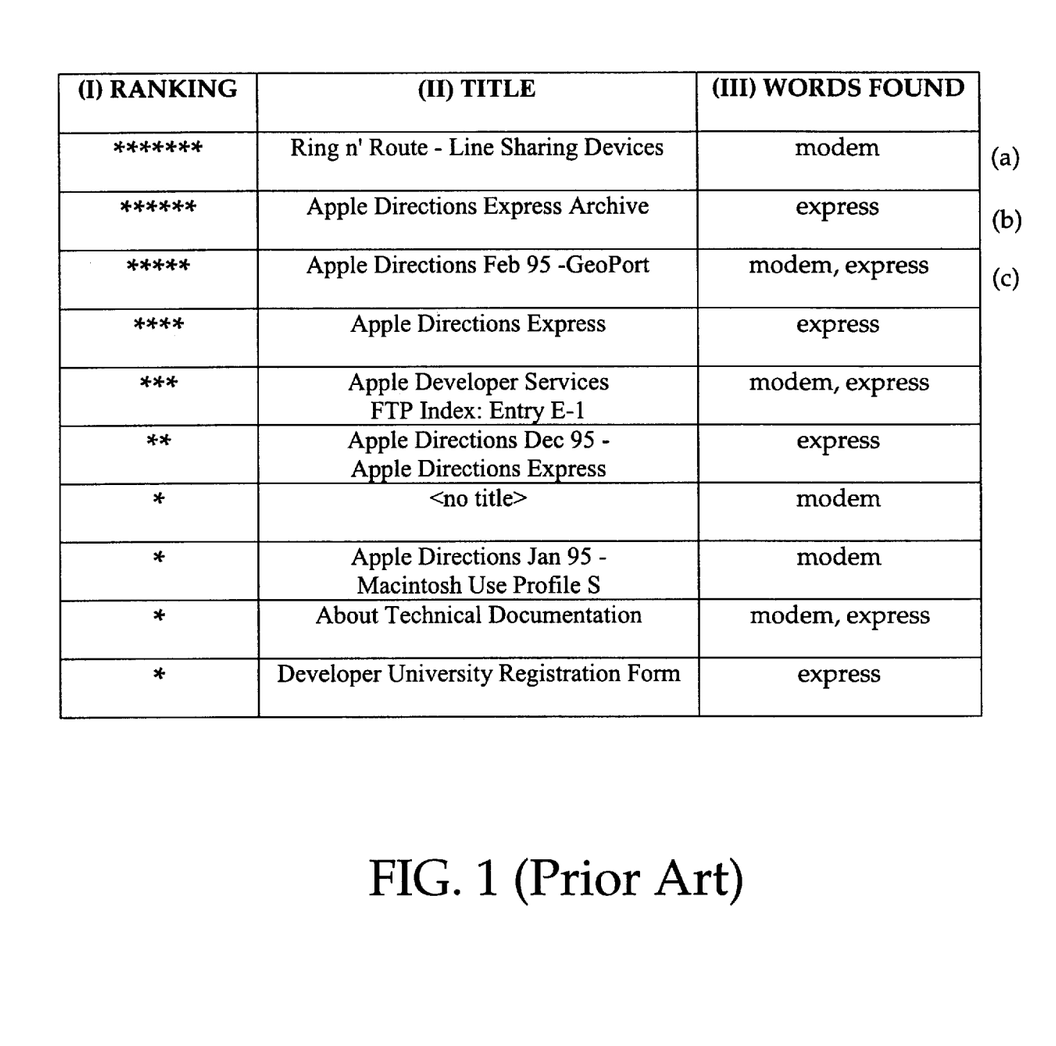
FIG. 1 is a table of search results for a two-word query using a conventional relevance-ranking algorithm.

The statistical methods that provide relevance-ranking, such as "TF×IDF weighting" with the cosine similarity metric, attempt to "reward" documents that are well-characterized by each query term. In practice, this means that a document that has a very high value for some of the query terms may be ranked higher than a document that has a lower value for more of the query terms. Relevance-ranking algorithms are intended to achieve this outcome. However, users sometimes find that for short queries submitted to relevance-ranking IR systems, the users' goal of obtaining the most useful ordering of search results, from the most relevant document to the least relevant document, is not attained. Existing relevance-ranking algorithms may, in some circumstances when a query is short, assign higher scores to certain documents with low overlaps than to other documents with high overlaps. Overlap is determined by the number of terms common between the query and the document. This problem is exemplified in FIG. 1, which is a table partially showing the results of a short query entered into the Apple Developer web site. The query term entered by a user was "express modem," whereby the user probably intended to retrieve documents about the Apple Computer product by that name. The search results included 103 documents, and the documents with the top ten relevance scores are shown in FIG. 1. Column I shows the ranking of the search results based on relevance scores indicated by the symbol *. Column II shows the titles of the retrieved documents, and column III identifies which terms in the query were responsible for the documents being retrieved. The highest scoring document contained only the term "modem," as shown in row (a). This document discussed modems in general, without mentioning the term "express modem." The second highest scoring document contained only the term "express" (as shown in row (b)) and was not relevant to modems. The third highest scoring document did discuss the "express modem" product, as shown in row (c).

Figure 1B:
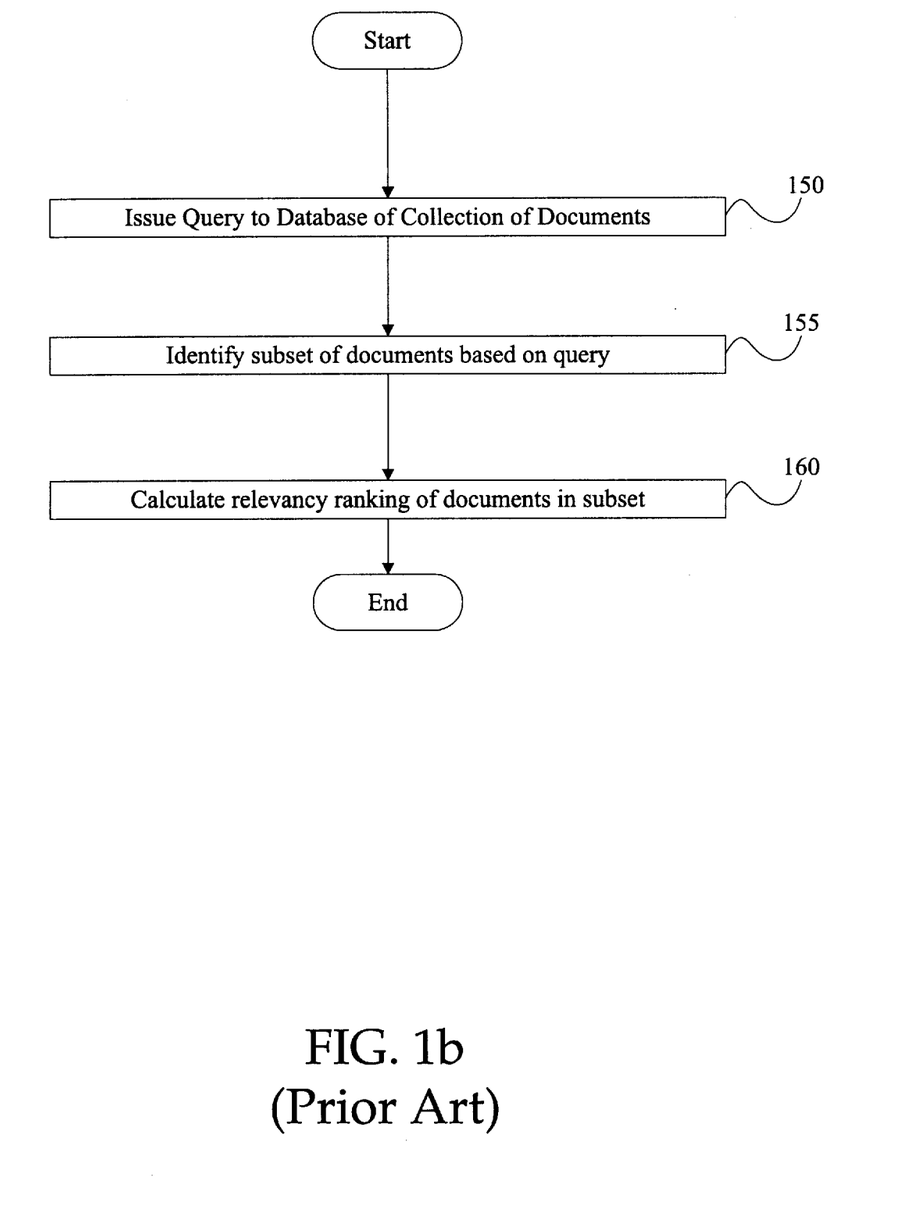
FIG. 1B is a flowchart showing the conventional relevance ranking method.

FIG. 1B shows the method used by the prior art to produce the results described above with reference to FIG. 1. The method starts with step 150, where a query defining the search criteria is issued to a database or other information retrieval system. Next, step 155 identifies a set of documents that meet the criteria defined in the query. Finally, step 160 assigns a relevancy ranking to each of the documents in the identified set using conventional relevancy ranking algorithms discussed above. A possible solution to the short query ranking problem discussed above is to use queries based on Boolean search technology. However, the Boolean approach sacrifices the benefits of relevance-ranking, while research has shown that most casual users do not understand Boolean logic and have difficulty in using Boolean IR systems. Attempts have been made to ease user problems with Boolean systems with solutions that blend Boolean and relevance-ranking. Noreault T., Koll, M., and McGill, M. J., *Automatic Ranked Output From Boolean Searches In SIRE*, Journal of the American Society For Information Science, Vol. 26, No. 6, pp. 333–39 (1977); and Salton, G, Fox, E. A., and Wu, H., *Extended Boolean Information Retrieval*, Communications of the ACM, Vol. 26, No. 12, pp. 1022–1036 (1983). However, the above approaches combine Boolean and relevance-ranking, and consequently users are still required to express their queries as Boolean expressions if they wish to take advantage of the Boolean constraints. In addition, the above approaches do not take query length into account when scoring the relevance of documents.

G. Salton and C. Buckley have suggested that the statistical weighting of a short query should differ from the statistical weighting of a long query. Salton, G. and Buckley, C., *Term-Weighting Approaches In Automatic Text Retrieval*, Information Processing & Management, Vol. 24, No. 5, pp. 513–523 (1988). Salton and Buckley did not, however, suggest that a matching algorithm should be modified as a function of query length, nor did they propose a function that changes the statistical weighting scheme of query terms as the query lengthens or shortens.

One study that notes the short query problem is by Hearst, Marti A., *Improving Full-Text Precision On Short Queries Using Simple Constraints*, Fifth Annual Symposium on Document Analysis and Information Retrieval, pp. 217–225 (1996). However, this approach limits ranking within the confines of the Boolean search, and only if users input their query in a prescribed way. In addition, this approach imposes limitations on users in their method of query input, and does not take query length into account. Additionally, although Hearst's system is described as targeting "short" queries, it appears to be optimized for much longer queries (8 words or more) than most users actually enter.

Furthermore, none of the above approaches work on an arbitrary relevance-ranking system.

Thus, there is a need for a system and method that overcome the short query problem of relevance-ranking information retrieval systems.

SUMMARY OF THE INVENTION

The present invention provides a system and method for retrieving information from a database or collection in response to a query by a user. The system is based on a model in which a retrieved document's score calculated from a relevance-ranking algorithm is increased by an amount dependent on the coordination level (i.e., the degree of overlap between the query terms and the document terms), the query length, and a parameter $\partial$, where $0 \leq \partial < 1$. According to this invention, the contribution of coordination to the relevance-ranking score is greater for short queries than for long queries. The relevance-ranking score is increased based on the coordination level. This effect of increasing by the coordination level is decreased as the query length is increased. Parameter $\partial$ controls the intensity of the coordination-influenced increases or "boosting" effect to the relevance-ranking score. As $\partial$ approaches its upper limit of 1, the document's relevance-ranking score is increased by the maximum amount. This maximum amount insures for two-word queries, for example, that those documents with an overlap of two (i.e., those documents containing both query words) are scored higher than those with an overlap of one (i.e., those documents containing only one of the query words), no matter how the terms are weighted. At lower values of $\partial$, this "boosting" effect on the retrieved document's relevance-ranking score, due to overlap, is decreased.

This invention avoids the problem presented by present relevance-ranking systems in response to short queries. The method includes the steps of receiving a signal or variable s having a value corresponding to a relevance-ranking algorithm score of a retrieved document, receiving a signal or variable q having a value corresponding to the number of words in the query and a signal or variable v having a value corresponding to a coordination level of the retrieved document and query, and generating an adjusted score s1 dependent on the signal s, the signal q and the signal v. The adjusted score s1 takes the coordination level into account for small values of q and gradually decreases the importance of the coordination level as q increases.

This invention also accepts input of signal or variable $\partial$ which is preferably chosen to adjust the intensity of the coordination-influenced boosting effect to the relevance-ranking score s.

The present invention, without sacrificing the benefits of the vector space model, solves the problem of current relevance-ranking algorithms which, for short queries in some circumstances, assign higher scores to certain documents with low overlap than to other documents with high overlap. Furthermore, the present invention improves the output score of any existing, unmodified ranking algorithm so that query length is taken into account.

DETAILED DESCRIPTION OF A PREFERRED EMBODIMENT

Figure 2:
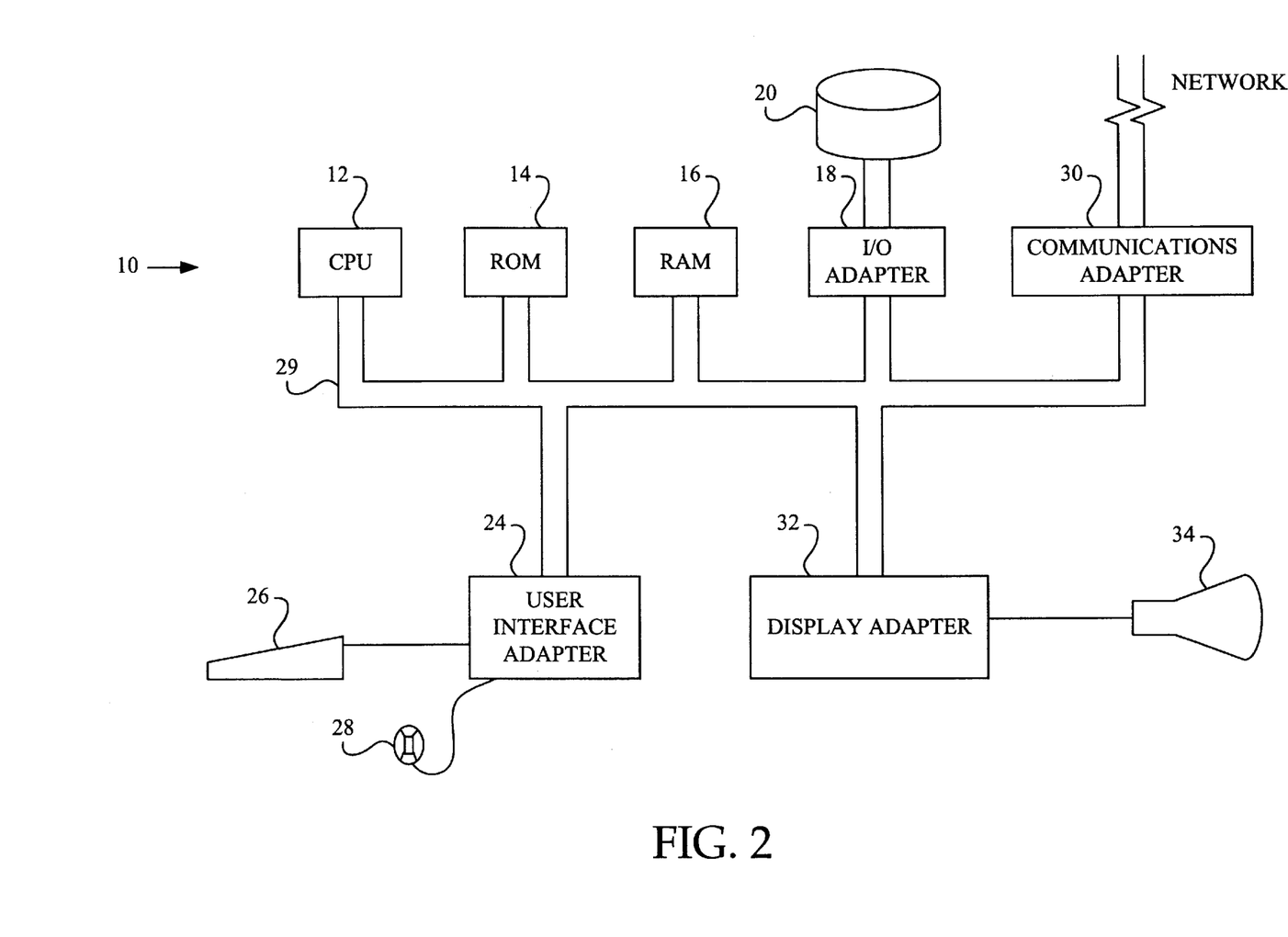
FIG. 2 is a block diagram of a computer system in accordance with the present invention.

FIG. 2 is a block diagram of a host computer system 10 capable of functioning with an apparatus and method of the present invention. The host computer system 10 may be a desktop computer, a workstation, a server, a personal digital assistant, or another computer system. Host computer system 10 preferably includes a central processing unit (CPU) 12 such as a conventional microprocessor, a read-only memory (ROM) 14, a random access memory (RAM) 16, an input/output (I/O) adapter 18 for connecting peripheral devices such as a disk unit 20, a user interface adapter 24 for connecting an input device such as a keyboard 26, a mouse 28, a touch screen device (not shown) and/or other user interface devices to a system bus 29. Communications adapter 30 connects the host computer system 10 to a data processing network and a display adapter 32 connects the system bus 29 to a display device 34.

The subject invention is implemented as code in a "search engine" software program that may be attached to an application program or to the operating system of host computer system 10. The search engine program provides the host computer system 10 the capability to search arbitrary data collections, either locally or across a network.

Users sometimes find that for short queries submitted to relevance-ranking IR systems, the user's goal of obtaining the most useful ordering of search results, from the most-relevant document to the least-relevant document, is not achieved. Existing relevance-ranking algorithms may, in some circumstances when the query is short, assign higher scores to certain documents with low overlap (between the query and retrieved document terms) than to other documents with high overlaps. The relevance-ranking problem presented by adjusting the raw score according to present systems in response to short queries is avoided by the following equation.

$$s1f(s,v,q,\partial) = \left[ s + \frac{(v-1)}{(q-\partial)^2} \right] \times \frac{(q-1)}{q} B \times \frac{(q-1)}{q} \qquad \text{Eq. (1)}$$

The term s1 represents the adjusted score. The term s represents a raw score obtained from any relevance-ranking algorithm. One example of the algorithm for calculating s includes, but is not limited to, the cosine similarity metric represented by Eq. (2).

$$\text{Similarity}(D,Q) = \frac{\sum_{i=1}^{n} (D_i \cdot Q_i)}{\left( \sum_{i=1}^{n} D_i^2 \cdot \sum_{i=1}^{n} Q_i^2 \right)^{1/2}} \qquad \text{Eq. (2)}$$

In Eq. (2), D is a document vector, and Q is a query vector.

The parameter v in Eq. (1), which is also known as the coordination level, represents the degree of overlap between the query terms and the retrieved document terms. Parameter v is determined by counting the number of terms (words) that are common between the query terms and the document terms. The following example illustrates how v is calculated. First, assume that the query contains three terms: "cat", "dog" and "horse." A document containing all three terms may be assigned a v value of 3. A document containing two of the terms may be assigned a v value of 2, while one containing only one of the terms may be assigned a v value of 1.

The parameter q in Eq. (1) represents the number of words in the query. The relevance-ranking score s is increased based on the coordination level v. In Eq. (1), the contribution of the coordination level v to the relevance-ranking score s is greater for short queries than for long queries. This increasing effect by the coordination level v is decreased as the query length q is increased. The following examples help illustrate the concept above:

EXAMPLE 1

If the query length is short and the coordination level is low, then the boost to the relevance-ranking score is low.

EXAMPLE 2

If the query length is short, and the coordination level is high, then the boost to the relevance-ranking score is high.

EXAMPLE 3

If the query length is long, and the coordination level is low, then the boost to the relevance-ranking score is low.

EXAMPLE 4

If the query length is long, and the coordination level is high, then the boost to the relevance-ranking score is low.

Parameter $\partial$ has a real value whereby $0 \leq \partial < 1$, and the user chooses the value of $\partial$ to control the intensity of the coordination-influenced increases or "boosting" effect to the relevance-ranking score s. As $\partial$ approaches its upper limit of 1, the document's relevance-ranking score s is increased by a maximum amount as determined by the factor $(v-1)/(q-\partial)^2$ in Eq. (1). This maximum amount insures that, for example, for two-word queries those documents with an overlap of two (i.e., those documents containing both query words) are scored higher than those documents with an overlap of one (i.e., containing only one of the query words), no matter how the words are weighted. At lower values of $\partial$, this boosting effect on the retrieved document's relevance-ranking score s is decreased.

The term (q−1)/q in Eq. (1) scales the resultant value of $[s+(v-1)/q-\partial)^2]$ back to the original range of s, whereby 0<s<1. The values of s fall between 0 and 1 because the vector space model traditionally uses the cosine function to measure similarity. The cosine function produces values between 0 and 1 when all components of the function are non-negative.

The anomalous results of relevance-ranking systems are due to the low value assigned by s to a document that has a high v overlap value when the query is short. In order to obtain search results that are more relevant to the terms of a short query, the search results should be assigned scores that take into account the coordination level. Eq. (1) overcomes the problem of conventional relevance-ranking algorithms by raising the relevance-ranking score of a document having a high v overlap value when the query is short. Thus in a short query, if the overlap is high, then the adjusted relevance-ranking score s1 of the document as determined by Eq. (1) is "high" (i.e., closer to 1 than to 0). In effect, for short queries, a coordination-like scoring is achieved between the query terms and the document, over and above the existing vector-based scoring. Additionally, parameter $\partial$ controls the strength of the coordination effect for Eq. (1). Thus a $\partial$ value closer to 1 maintains the coordination-like scoring as the query length lengthens, while smaller values of $\partial$ reduce this coordination effect. The user sets the value of $\partial$ according to his or her requirements.

For Eq. (1) if the v overlap value from a short query is low, then the amount the score is boosted for the document is closer to 0 than to 1.

Figure 3A:
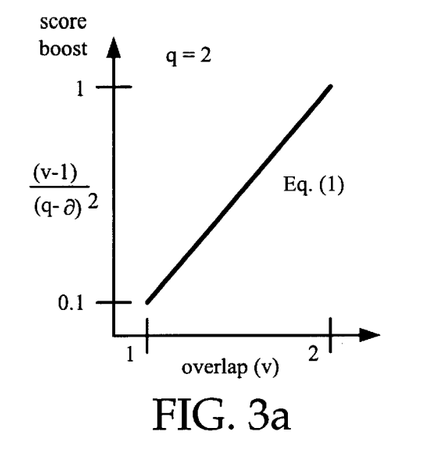
FIGS. 3a through 3d are two-dimensional graphs of the term $(v-1)/(q-\partial)^2$ used for queries of various lengths in the present invention.
Figure 3B:
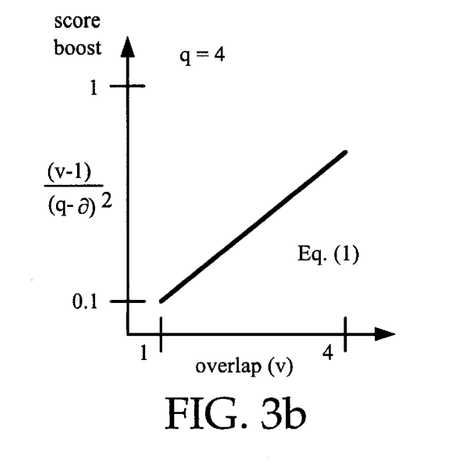
Figure 3C:
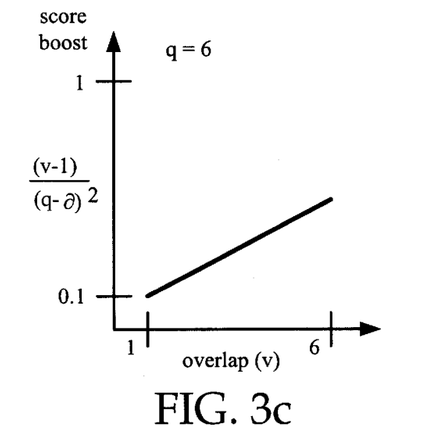
Figure 3D:
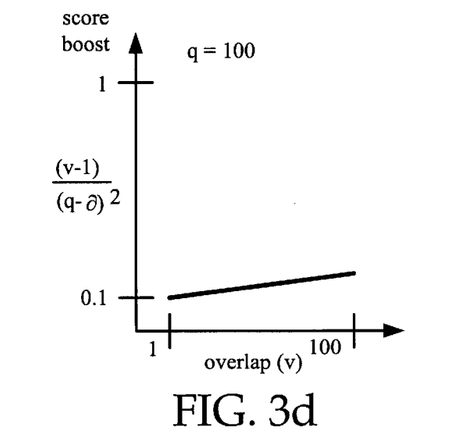
Figure 4:
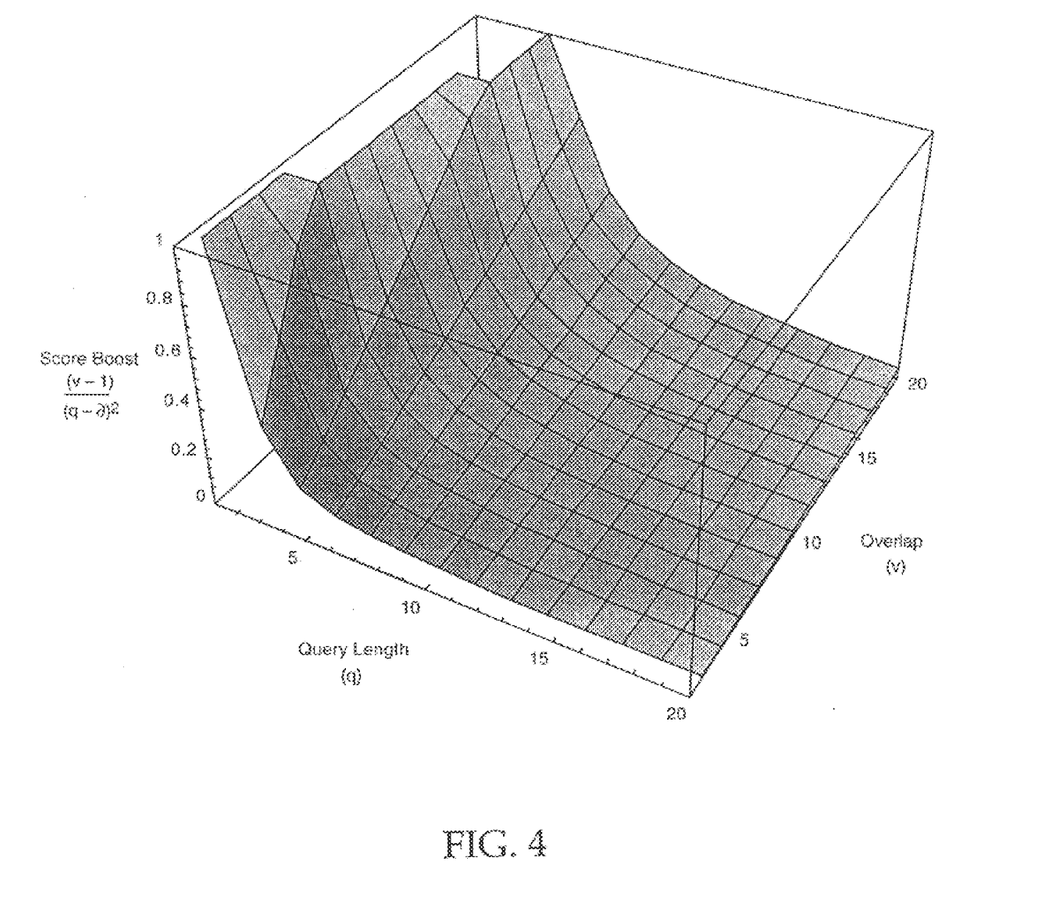
FIG. 4 is a three-dimensional graph of the term $(v-1)/(q-\partial)^2$ used in the present invention.

When the query is long, the v overlap parameter does not raise the score of s significantly for lower values of $\partial$. Thus the adjusted score s1 as determined by Eq. (1) is about equal to s. FIGS. 3a to 3d show two-dimensional graphs of the $(v-1)/(q-\partial)^2$ term of Eq. (1) for different query lengths and as the v overlap value is increased from 1 (the smallest possible value) to its largest possible value (when all of the query terms are in the retrieved document). FIG. 3d shows that for a query length of 100, the term $(v-1)/(q-\partial)^2$ is almost equal to 0. Thus in Eq. (1), $f(s,v,q,\partial) \cong s$ when the query is long. FIG. 4 shows a three-dimensional graph of the term $(v-1)/(q-\partial)^2$ of Eq. (1).

Based on the adjusted relevance-ranking score s1 determined by Eq. (1), each document score is calculated, and the retrieved documents are then outputted sequentially from the one with the highest score to the one with the lowest score. Finally, other equations may be substituted for Eq. (1) to adjust the relevance-ranking score of a retrieved document so that the search results are assigned scores that take the coordination level into account for short queries and so that the coordination level decreases in importance as the query length is increased.

Figure 5:
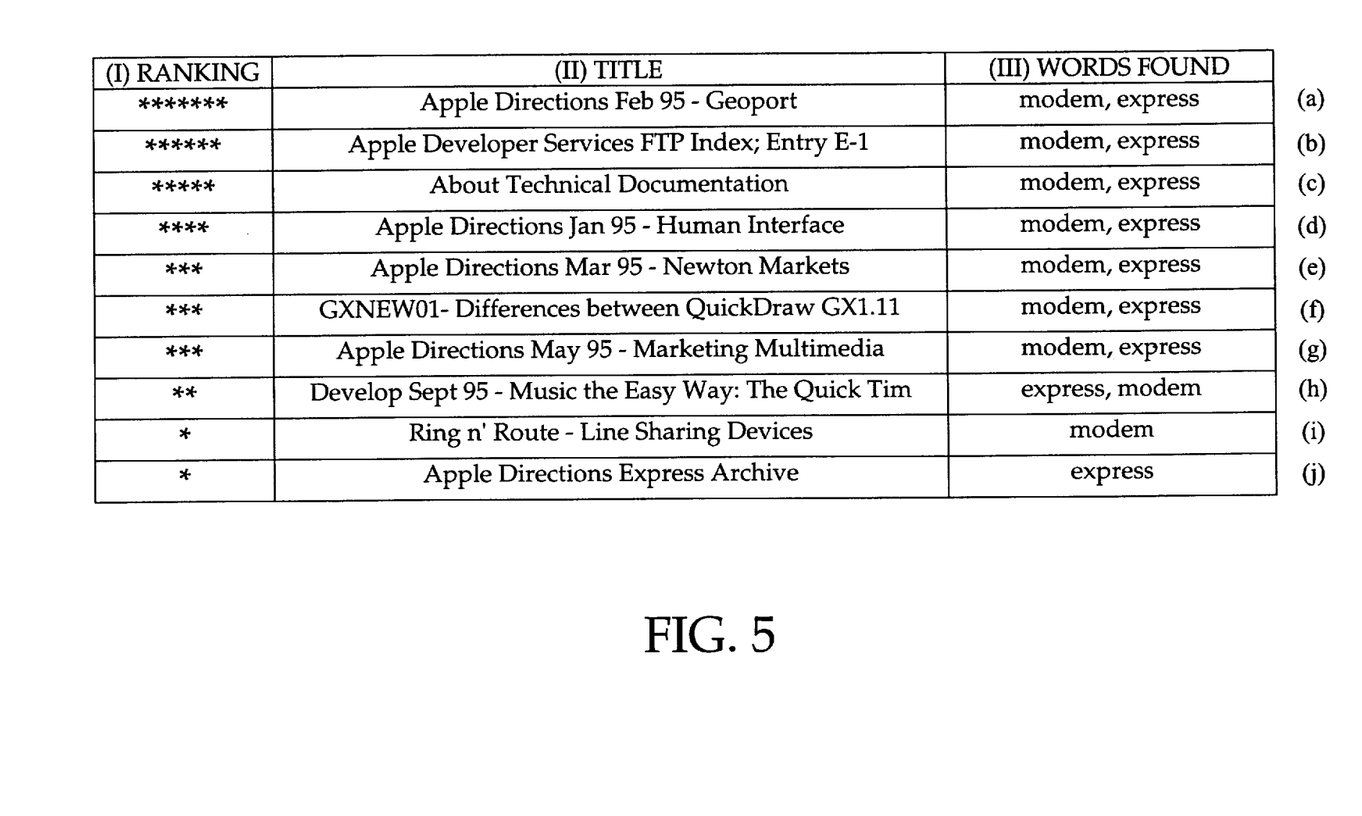
FIG. 5 is a table of search results for a query containing two words and using the adjusted relevance-ranking algorithm of the present invention.

FIG. 5 shows the search results in the Apple Developer web site for the two-word query "express modem" when using the adjusted relevance-ranking algorithm of Eq. (1), with $\partial=0.5$. As shown in column III, documents containing both words in the query term "express modem" (rows (a) to (h)) are now (in contrast to FIG. 1) ranked higher than documents containing only one of the terms (rows (i) and (j)).

Figure 6:
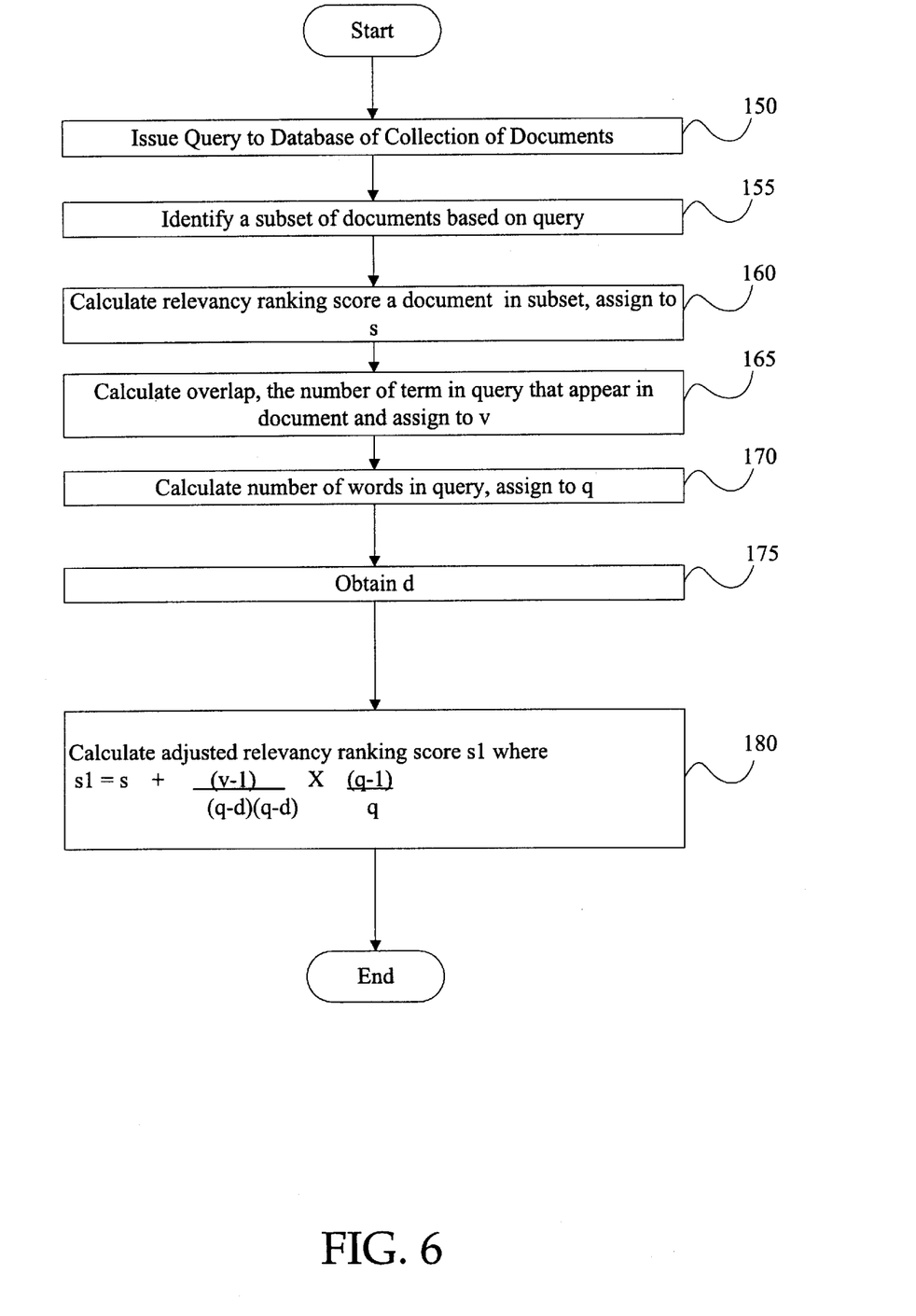
FIG. 6 is flowchart showing the method used to produce an adjusted relevancy ranking score.

FIG. 6 is a flowchart describing the adjusted relevancy ranking method used to produce the results shown in FIG. 5. The method starts with step 150, where a query defining search criteria is issued to a database or other information retrieval system. Next, step 155 identifies a set of documents that meet the criteria defined in the query. Step 160 calculates a relevancy ranking for a document in the identified set and assigns the ranking score to a variable "s". Step 165 then calculates the overlap, which, as described above, is the number of terms in the query that appear in the document. The overlap value is assigned to a variable "v". Next, step 170 calculates the number of terms in the query and assigns the calculated value to a variable "q". Step 175 obtains the value of $\partial$, which is used to adjust the impact of the adjustment on the relevancy ranking score. Finally, step 180 determines the adjusted relevancy ranking score using Eq. 1.

The adjusted relevance-ranking algorithm of Eq. (1) has been measured against the standard cosine ranking method using the TREC-4 test collections. In calculating the R-precision (i.e., the precision after R documents, where R is the total number of relevant documents for the query), Eq. (1) shows an improvement over the TF×IDF cosine ranking method by 21.3%, 10.4%, 11.9% and 7.9% for query terms containing two, three, four, and all words respectively in the document.

While various embodiments and applications of this invention have been shown and described, it will be apparent to those skilled in the art that various modifications are possible without departing from the inventive concepts described herein. The invention, therefore, is not to be restricted except in the spirit of the appended claims.

What is claimed is:

1. A method for a computer system, having a CPU and RAM, to retrieve information in response to a query, comprising the steps of:

issuing a query on a database;

identifying a retrieved document based on the query;

receiving into said RAM said retrieved document and an accompanying variable s having a value corresponding to a relevance-ranking score of said retrieved document;

receiving into said RAM a variable q having a value corresponding to the number of words in the query and a variable v having a value corresponding to the overlap between the words in said retrieved document and in the query; and using said CPU and said variables s, q and v to generate an adjusted score s1 corresponding to the value of said variable s increased by an amount proportional to the value of said variable v, said amount decreasing as the value of said variable q increases.

2. The method of claim 1, further comprising the steps of:

receiving into said RAM additional retrieved documents and accompanying variables s;

generating adjusted scores s1 for said additional retrieved documents; and ordering said retrieved documents according to said adjusted scores s1.

3. The method of claim 1, further comprising the step of:

receiving into said RAM a variable $\partial$ chosen to control the increase to said variable s by said amount dependent on said variable v.

4. The method of claim 1, further comprising the steps of:

receiving into said RAM additional retrieved documents and accompanying variables s; and generating adjusted scores s1 for said additional retrieved documents.

5. A computer system for assigning an adjusted relevancy score to information retrieved in response to a query, comprising:

a CPU, RAM and a database;

means for issuing a query on the database;

means for identifying a retrieved document based on the query;

means for receiving into said RAM a retrieved document and an accompanying variable s having a value corresponding to a relevance-ranking score of said retrieved document;

means for receiving into said RAM a variable q having a value corresponding to the number of words in the query and a variable v having a value corresponding to the overlap between the words in said retrieved document and in the query; and means for generating, dependent on said variables s, q and v, an adjusted score s1 equal to the value of said variable s increased by an amount dependent on the value of said variable v, said amount decreasing as the value of said variable q increases.

6. The computer system of claim 5 wherein:

said means for receiving a retrieved document comprises means for receiving additional retrieved documents and accompanying variables s; and said means for generating generates adjusted scores s1 for said additional retrieved documents; and further comprising means for ordering said retrieved documents according to said adjusted scores s1.

7. The computer system of claim 5, further comprising:

means for receiving a variable ∂ chosen to control the increase to said variable s by said amount dependent on said variable v.

8. The computer system of claim 5 wherein:

said means for receiving document comprises means for receiving additional retrieved documents and accompanying variables s; and said means for generating generates adjusted scores s1 for said additional retrieved documents.

9. A computer system for assigning an adjusted relevancy score to information retrieved in response to a query, comprising:

a CPU, RAM and a database;

means for issuing a query on the database;

means for identifying a retrieved document based on the query;

means for receiving into said RAM said retrieved document;

means responsive to a variable s having a value corresponding to a relevance-ranking score of said retrieved document;

means responsive to a variable q having a value corresponding to the number of words in the query and to a variable v having a value corresponding to the overlap between the words in said retrieved document and in the query; and a function generator for receiving said variables s, q and v and responsively generating an adjusted score s1 equal to the value of said variable s increased by an amount dependent on the value of said variable v, said amount decreasing as the value of said variable q increases.

10. The computer system of claim 9 wherein said means responsive to a variable s is responsive to additional variables s having values corresponding to relevance-ranking scores of accompanying retrieved documents; and said function generator receives said additional variables s and responsively generates corresponding adjusted scores s1 for said additional variables s; and further comprising means for ordering said retrieved documents according to adjusted scores s1.

11. The computer system of claim 9, further comprising:

means for receiving a variable ∂ chosen to control the increase to said variable s by said amount dependent on said variable v.

12. The computer system of claim 9 wherein:

said means responsive to a variable s is responsive to additional variables s having values corresponding to relevance-ranking scores of additional retrieved documents; and said function generator receives said additional variables s and responsively generates corresponding adjusted scores s1 for said additional variables s.

13. A method for a computer system having a CPU, RAM, and a database to assign a relevancy score to information retrieved in response to a query, comprising the steps of:

issuing a query on said database;

identifying a retrieved document based on the query;

receiving into said RAM said retrieved document and an accompanying variable s having a value corresponding to a relevance-ranking score of said retrieved document;

receiving into said RAM said variable f1 having a value dependent on the number of words in the query and on a value corresponding to the overlap between words in said retrieved document and in the query; and using said CPU to add said variable f1 to said variable s to generate a function B equal to the value of said variable s increased by an amount dependent on the value of said variable f1, said amount decreasing as the number of words in the query increases.

14. The method of claim 13, further comprising the steps of:

receiving into said RAM a variable f2 having a value dependent on the number of words in the query; and using said CPU to multiply said variable f2 with said function B to produce a scaled function f3 having a value in the range from 0 to 1 and corresponding to the value of said variable s increased by an amount dependent on the value of said variable f1, said amount decreasing as the number of words in the query increases.

15. The method of claim 14, further comprising the step of:

adjusting said variable f1 to control the increase to said variable s by said amount dependent on said variable f1.

16. The method of claim 14, further comprising the steps of:

receiving into said RAM additional retrieved documents and accompanying variables s;

generating scaled functions f3 for said additional retrieved documents; and ordering said retrieved documents according to said scaled functions f3.

17. The method of claim 13, further comprising the steps of:

receiving additional retrieved documents and accompanying variables s; and generating additional functions B for said additional retrieved documents.

18. A computer system for assigning an adjusted relevancy score to information retrieved in response to a query, comprising:

means for issuing a query on a database;

means for identifying a retrieved document based on said query;

means for receiving into a retrieved document and an accompanying variable s having a value corresponding to a relevance-ranking score of said retrieved document;

means for receiving a variable f1 having a value dependent on the number of words in the query and on a value corresponding to the overlap between the words in said retrieved document and in the query; and means for adding said variable s to said variable f1 to generate a function B corresponding to the value of said variable s increased by an amount dependent on the value of said variable f1.

19. The computer system of claim 18 further comprising:

means for receiving a variable f2 having a value dependent on said number of words in the query; and means for multiplying said variable f2 with said function B to produce a scaled function f3 having a range from 0 to 1 and corresponding to the value of said variable s increased by an amount dependent on the value of said variable f1.

20. The computer system of claim 19, further comprising:

means for adjusting said variable f1 to control the increase to said variable s by said amount dependent on said variable f1.

21. The computer system of claim 18, further comprising:

means for determining values of said scaled function f3 corresponding to other retrieved documents; and means for ordering said retrieved documents based on the corresponding values of said scaled function f3.

22. The computer system of claim 18, further comprising:

means for adjusting said variable f1 to control the increase to said variable s by said amount dependent on said variable f1.

23. The computer system of claim 18 wherein:

said means for receiving a retrieved document and an accompanying variable s is set to further receive additional retrieved documents and accompanying variables s; and said means for adding is set to generate additional functions B corresponding to the values of said accompanying variables s increased by said amount dependent on the value of said variable f1.

24. A computer system for assigning an adjusted relevancy score to information retrieved in response to a query, comprising:

a function generator for producing a function s having a value corresponding to a relevance-ranking score of a retrieved document;

a variable f1 having a value dependent on the number of words in the query and on a value corresponding to the overlap between the words in said retrieved document and in the query; and an adder, coupled to said function generator, for adding said variable f1 to said variable s to generate a function B corresponding to the value of said variable s increased by an amount dependent on the value of said variable f1, said amount decreasing as the number of words in the query increases.

25. The computer system of claim 24, further comprising:

means for receiving a variable f2 having a value dependent on said number of words in the query; and a multiplier for multiplying said variable f2 with said functions B to produce a scaled function f3 having a range from 0 to 1 and corresponding to the value of said variable s increased by an amount dependent on the value of said variable f1, said amount decreasing as the number of words in the query increases.

26. The computer system of claim 25, further comprising:

an adjusting unit for adjusting said variable f1 to control the increase to said variable s by said amount dependent on said variable f1.

27. A method for a computer system having a CPU and RAM to assign an adjusted relevancy score to information identified in response to a query, comprising the steps of:

receiving into said RAM a variable s having a value corresponding to a relevance-ranking score of an identified document;

receiving into said RAM a variable q having a value corresponding to the number of words in the query and a variable v having a value corresponding to the overlap between the number of words in said identified document and in the query; and using said CPU and said variables s, q and v to generate an adjusted score s1 corresponding to the value of said variable s increased by an amount proportional to the value of said variable v, said amount decreasing as the value of said variable q increases.

28. The method of claim 27, further comprising the steps of:

receiving into said RAM additional variables s having values corresponding to relevance-ranking scores of additional identified documents; and generating adjusted scores s1 for said additional identified documents.

29. The method of claim 28 further comprising the step of:

ordering said adjusted scores s1 for ranking said identified documents in response to the query.

30. The method of claim 27, further comprising the step of:

receiving into said RAM a variable $\partial$ chosen to control the increase to said variable s by said amount dependent on said variable v.

31. A computer system for identifying information in response to a query, comprising:

means for receiving a variable s having a value corresponding to a relevance-ranking score of an identified document;

means for receiving a variable q having a value corresponding to the number of words in the query and a variable v having a value corresponding to the overlap between the words in said identified document and in the query; and means for generating, dependent on said variables s, q and v, an adjusted score s1 corresponding to the value of said variable s increased by an amount dependent on the value of said variable v, said amount decreasing as the value of said variable q increases.

32. The computer system of claim 31 wherein:

said means for receiving a variable s receives additional variables s corresponding to relevance ranking scores of additional identified documents; and said means for generating generates adjusted scores s1 for said additional identified documents.

33. The computer system of claim 32 further comprising:

means for ordering said adjusted scores s1 for ranking said identified documents in response to the query.

34. The computer system of claim 31, further comprising:

means for receiving a variable $\partial$ chosen to control the increase to said variable s by said amount dependent on said variable v.

35. A method for a computer system to identify information in response to a query, comprising the steps of:

receiving a variable s having a value corresponding to a relevance-ranking score of an identified document;

receiving a variable f1 having a value dependent on the number of words in the query and on a value corresponding to the overlap between words in said identified document and in the query; and adding said variable f1 to said variable s to generate a function B corresponding the value of said variable s increased by an amount dependent on the value of said variable f1, said amount decreasing as the number of words in the query increases.

36. The method of claim 35, further comprising the steps of:

receiving a variable f2 having a value dependent on the number of words in the query; and multiplying said variable f2 with said function B to produce a scaled function f3 having a value in the range from 0 to 1 and corresponding to the value of said variable s increased by an amount dependent on the value of said variable f1, said amount decreasing as the number of words in the query increases.

37. The method of claim 35, further comprising the step of:

adjusting said variable f1 to control the increase to said variable s by said amount dependent on said variable f1.

38. The method of claim 35, further comprising the steps of:

receiving additional variables s corresponding to relevance-ranking scores of additional identified documents; and generating additional functions B for said additional identified documents.

39. A computer system for identifying information in response to a query, comprising:

means for receiving a variable s having a value corresponding to a relevance-ranking score of an identified document;

means for receiving a variable f1 having a value dependent on the number of words in the query and on a value corresponding to the overlap between the words in said identified document and in the query; and means for adding said variable s to said variable f1 to generate a function B corresponding to the value of said variable s increased by an amount dependent on the value of said variable f1.

40. The computer system of claim 39 further comprising:

means for receiving a variable f2 having a value dependent on said number of words in the query; and means for multiplying said variable f2 with said function B to produce a scaled function f3 having a value in the range from 0 to 1 and corresponding to the value of said variable s increased by an amount dependent on the value of said variable f1.

41. The computer system of claim 39, further comprising:

means for adjusting said variable f1 to control the increase to said variable s by said amount dependent on said variable f1.

42. The computer system of claim 39 wherein said means for adding generates additional functions B corresponding to other identified documents.

43. The computer system of claim 42 further comprising:

means for ordering said identified documents based on the corresponding values of said functions B.

44. A program recorded in a computer-readable medium for causing a computer to perform the steps of:

receiving a variable s having a value corresponding to a relevance-ranking score of an identified document;

receiving a variable q having a value corresponding to the number of words in the query and a variable v having a value corresponding to the overlap between the words in said identified document and in the query; and using said variables s, q and v to generate an adjusted score s1 corresponding to the value of said variable s increased by an amount dependent on the value of said variable v, said amount decreasing as the value of said variable q increases.

45. A program recorded in a computer-readable medium for causing a computer to perform the steps of:

receiving a variable s having a value corresponding to a relevance-ranking score of an identified document;

receiving a variable f1 having a value dependent on the number of words in the query and on a value corresponding to the overlap between words in said identified document and in the query; and adding said variable f1 to said variable s to generate a function B corresponding the value of said variable s increased by an amount dependent on the value of said variable f1, said amount decreasing as the number of words in the query increases.

* * * * *

UNITED STATES PATENT AND TRADEMARK OFFICE
CERTIFICATE OF CORRECTION

PATENT NO : 5,870,740

DATED : February 9, 1999

INVENTOR(S) : Rose, et al.

It is certified that error appears in the above-identified patent and that said Letters Patent is hereby corrected as shown below:

In the claims:

Column 9, line 31, insert --a retrieved-- between "receiving" and "document".

Column 12, line 2, replace "functions B" with --function B--.

Signed and Sealed this

Fifth Day of October, 1999

*Attest:*

Q. TODD DICKINSON

*Attesting Officer*  Acting Commissioner of Patents and Trademarks